United States Patent [19]
Woiceshyn

[11] Patent Number: 5,439,726
[45] Date of Patent: Aug. 8, 1995

[54] BITUMINOUS ROOFING MEMBRANE INCLUDING A LIGHTWEIGHT GRID AND OVER-UNDER CONSTRUCTION

[75] Inventor: D. Mark Woiceshyn, St. Catharines, Canada

[73] Assignee: Bay Mills Limited, Ontario, Canada

[21] Appl. No.: 230,813

[22] Filed: Apr. 21, 1994

Related U.S. Application Data

[60] Division of Ser. No. 77,404, Jun. 16, 1993, Pat. No. 5,314,556, which is a continuation of Ser. No. 860,196, Mar. 26, 1992, abandoned, which is a continuation of Ser. No. 520,770, May 8, 1990, abandoned.

[51] Int. Cl.⁶ ............................................. B32B 11/00
[52] U.S. Cl. .................................. 428/109; 428/113; 428/114; 428/141; 428/232; 428/236; 428/247; 428/265; 428/269; 428/287; 428/290; 428/291; 428/295; 428/301
[58] Field of Search ............... 428/105, 113, 114, 291, 428/284, 285, 286, 289, 290, 292, 293, 294, 232, 236, 107, 109, 110, 238, 239, 246, 247, 251, 252, 255, 287, 141, 265, 269, 291, 295, 301

[56] References Cited

U.S. PATENT DOCUMENTS

| | | | |
|---|---|---|---|
| 2,919,217 | 12/1959 | Bobkowicz | 428/302 |
| 3,390,439 | 7/1968 | Kalwaites | 156/439 |
| 3,674,583 | 7/1972 | Allport | 156/179 |
| 3,728,195 | 4/1973 | Bolles | 156/441 |
| 3,843,579 | 10/1974 | Eanzel | 260/29.6 F |
| 3,940,534 | 2/1976 | Fick et al. | 428/228 |
| 3,993,828 | 11/1976 | McCorsley, III | 428/236 |
| 4,230,762 | 10/1980 | Iwasaki et al. | 428/287 |
| 4,248,650 | 2/1981 | Murro | 156/181 |
| 4,324,453 | 4/1982 | Patel | 350/96.23 |
| 4,368,228 | 1/1983 | Gorgati | 428/110 |
| 4,388,364 | 6/1983 | Sanders | 428/253 |
| 4,454,184 | 6/1984 | Britton | 428/295 |
| 4,491,617 | 1/1985 | O'Connor et al. | 428/236 |
| 4,518,640 | 5/1985 | Wilkens | 428/102 |
| 4,539,254 | 9/1985 | O'Connor et al. | 428/236 |
| 4,540,311 | 9/1985 | Leach | 404/72 |
| 4,615,934 | 10/1986 | Ellison | 428/254 |
| 4,617,229 | 10/1986 | Larsson et al. | 428/284 |
| 4,755,423 | 7/1988 | Greiser et al. | 428/284 |
| 4,762,744 | 8/1988 | Woiceshyn et al. | 428/219 |
| 4,780,350 | 10/1988 | O'Connor et al. | 428/109 |
| 4,871,605 | 10/1989 | Pagen et al. | 428/141 |
| 4,879,163 | 11/1989 | Woiceshyn | 428/198 |
| 5,057,172 | 10/1991 | Woiceshyn | 156/148 |
| 5,070,540 | 12/1991 | Bettcher et al. | 2/2.5 |
| 5,116,682 | 5/1982 | Chakravarti et al. | 428/395 |

Primary Examiner—George F. Lesmes
Assistant Examiner—Kathleen L. Choi
Attorney, Agent, or Firm—Fitzpatrick, Cella, Harper & Scinto

[57] ABSTRACT

A reinforced bituminous roofing membrane includes a first layer, a second layer, a third layer and bituminous material. The first layer consists essentially of a lightweight, open grid of adhesively bound non-woven fabric in which yarns in the cross-machine direction are held between pairs of yarns in the machine direction, each such pairs of yarns having one yarn that is essentially above the other and each such pair of yarns being coated and bound next to the other by adhesive which accumulates between the yarns of each pair. The second layer consists essentially of a high strength reinforcing fabric, while the third layer consists essentially of a porous fiberglass mat. The bituminous material saturates and contains the first, second and third layers, such that the three layers are completely embedded within the bituminous material and the bituminous material on one side of the membrane bonds through the layers to the bituminous material on the other side of the membrane.

6 Claims, 3 Drawing Sheets

BITUMINOUS ROOFING MEMBRANE INCLUDING A LIGHTWEIGHT GRID AND OVER-UNDER CONSTRUCTION

This application is a divisional of application Serial No. 08/077,404 filed Jun. 16, 1993, now U.S. Pat. No. 5,314,556 which is a continuation of application Ser. No. 07/860,196 filed Mar. 26, now abandoned, which is a continuation of application Ser. No. 07/520,770 filed May 8, 1990, now abandoned.

This invention relates to roofing membranes made from asphalt or other bituminous material. The invention comprises a process for making reinforced roofing membranes and a reinforcing layer for roofing membranes.

BACKGROUND OF THE INVENTION

For a long time roofing membranes were made from organic felts saturated with bituminous materials such as asphalt or modified bitumen. For several years, those membranes have been improved by adding polyester or fiberglass open grids for strength and fiberglass mats for dimensional stability. See, for example, commonly assigned U.S. Pat. Nos. 4,491,617 and 4,539,254.

In this art, it is still generally believed necessary, even with the improved high strength grids, to continue to utilize during manufacture and retain in the final product an organic felt or mat of some kind, such as a polyester mat, to provide adhesion of bitumen to the reinforcing elements, to increase stiffness, to increase bulk, and to provide toughness to resist punctures. In addition, during processing in vats of high temperature bituminous material, such mats hold the grids of the high strength reinforcing elements in place and together inside the bituminous material. For example, without a polyester mat, a high-strength polyester scrim used for reinforcing comes apart in the vat of hot bituminous material during manufacture of the roofing membrane. In addition, high strength grids manufactured without a polyester mat to hold them together have a tendency to "pull-out" from the fiberglass mat and come to the surface of the roofing membrane. This occurs while the membrane is being coated with bituminous material or during the cooling stages. It is desirable, however, that the polyester grid remain embedded inside the bitumen.

As an example, one current reinforcement for roofing membranes comprises a heavy polyester, open-grid scrim (2.67×2.67 yarns per inch, 1000 denier, about 2.0 ounces per square yard) laminated to a lightweight polyester mat (0.5 ounce per square yard, about 17 grams per square meter). This polyester grid/mat product is led with a fiberglass mat (3.75 ounces per square yard) through a vat of bituminous material to create a roofing membrane coated on both sides with bituminous material. During processing the polyester grid is sandwiched between the two mats. One purpose of the polyester mat during this processing is to hold the polyester grid yarns against the fiberglass mat. Without such a lightweight polyester mat, the polyester grid, which is held together with a thermoplastic adhesive (without any mechanical fastening at the cross-overs of the grid), would have a tendency to come apart and/or pull out to the surface of the membrane during impregnation with hot bituminous material.

A problem with this roofing membrane, however, is delamination of the top and bottom bituminous layers in the final product. While the porosity of the lightweight polyester mat is high and saturates rapidly, the polyester mat does not allow the bituminous layers on either side of it to adhere to each other to a great degree. One method used to reduce this problem is to go to the extra step of needle-punching holes in such mats to promote saturation and adhesion, but this added manufacturing step requires additional expense.

Accordingly, a need exists to overcome the above noted drawbacks and produce better and more economical products.

SUMMARY OF THE PRESENT INVENTION

In the process of the present invention, a roofing membrane is made by selecting a lightweight polyester fabric that consists essentially of a lightweight non-woven open grid of an over-under construction scrim. Surprisingly, this fabric may replace the organic, polyester mats previously used and has advantages of cost and performance over such mats.

The finished roofing membrane product of this invention has much improved resistance to delamination, which has been demonstrated dramatically at lap joints that are formed in a roof when the final product is installed. Because of increased strength between the layers, the lap joint strength increases considerably. This is important since a great many roof failures occur because of weak lap joints.

DESCRIPTION OF THE PREFERRED EMBODIMENTS

As used herein, "over-under construction" refers to a non-woven fabric 1 in which yarns 2 in the cross-machine direction (the "fill" yarns) are held between pairs of yarns 3 in the machine direction. The pairs of yarns in the machine direction are essentially one above the other, and the fill yarns pass between the yarns in the pair. Thus, the upper machine-direction yarns lie in one plane, the lower machine direction yarns lie in a second plane, and the fill yarns lie between them in an intermediate plane. Therefore, wherever a fill yarn crosses a pair of machine-direction yarns, one machine-direction yarn is over, and one machine-direction yarn is under, the fill yarn. Such non-woven fabrics may typically be held together by adhesives 4.

Figure 1:
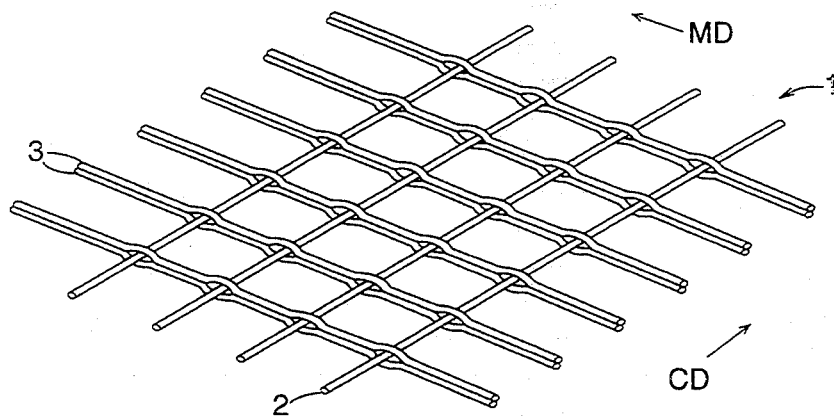
FIG. 1 represents in perspective a lightweight non-woven open grid of an over-under construction scrim. "MD" and its associated arrow in this and other Figures refers to "machine direction" or warp direction, and "CD" and its associated arrow refer to "cross-machine direction" or weft direction.
Figure 2:
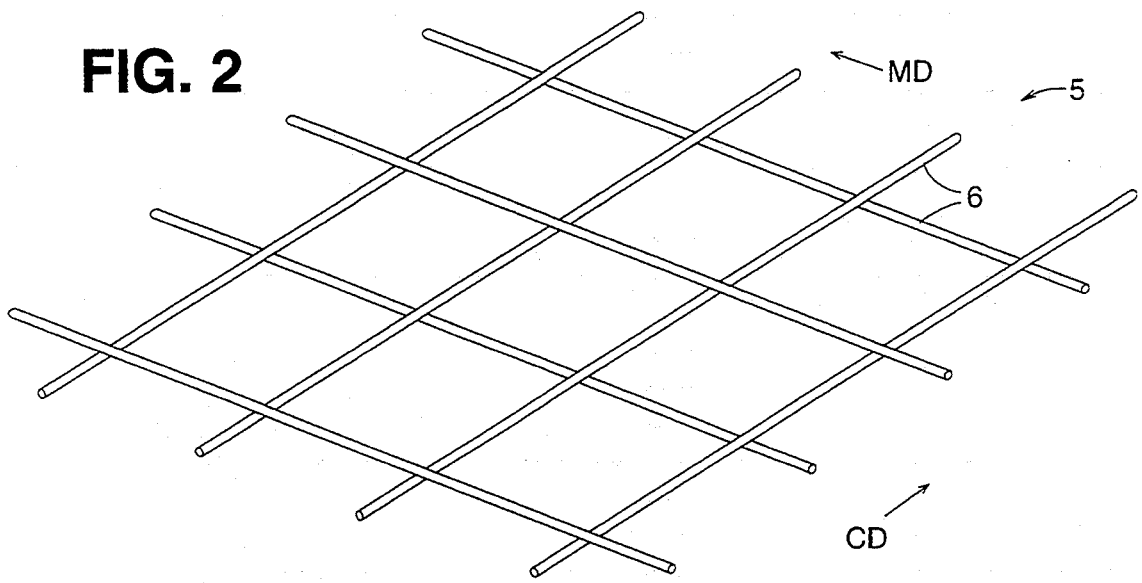
FIG. 2 represents in perspective a high strength, open grid reinforcing fabric.
Figure 3:
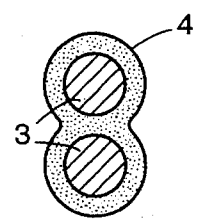
FIG. 3 represents in cross section two of the machine direction filaments of the grid of FIG. 1 and adhesive surrounding them.
Figure 4:
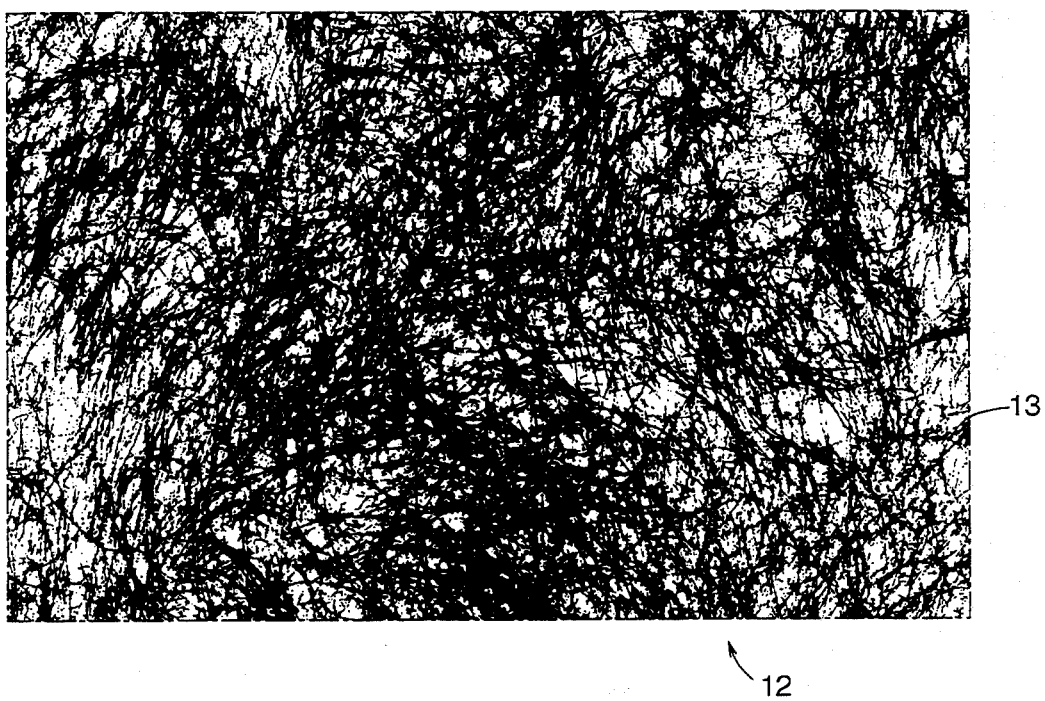
FIG. 4 represents a mat of entangled filaments.
Figure 5:
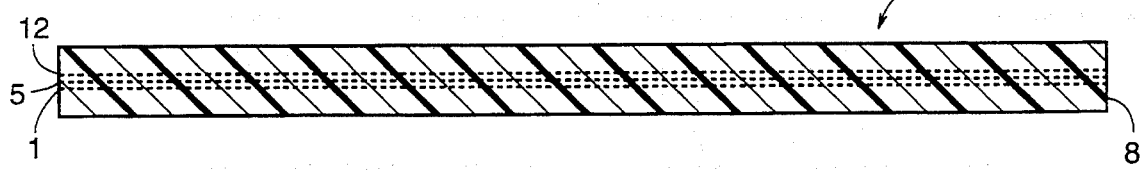
FIG. 5 represents schematically a roofing membrane consisting of three reinforcing layers embedded in a bituminous material.

Because of their over-under construction, the machine-direction yarns can hold high quantities of adhesive: the adhesive accumulates between the two yarns in each pair and binds them together well, holding the fill yarns securely between them as represented in FIG. 3. This reduces the tendency of the lightweight non-woven polyester fabric, which has no mechanical connection at the cross-over points, to come apart during processing.

The process of this invention further comprises combining the above over-under fabric with a high strength, open grid reinforcing fabric 5, preferably a non-woven fabric of high tenacity polyester 6 without mechanical connections at its yarn cross-over points. In accordance with this invention, the lightweight over-under grid and the high strength grid may then be led through a vat 7 in FIG. 6 of hot bituminous material 8, without any organic felt or polyester mat. As in prior processes, appropriate rollers 9 or doctor blades 14 are used, and the bituminous material coats the grids and forms a roofing membrane 10. The grids do not come apart in the hot vat and the high strength grid does not pull out of or come to the surface of the membrane. In addition, the final product has a reduced tendency to delaminate.

Figure 6:
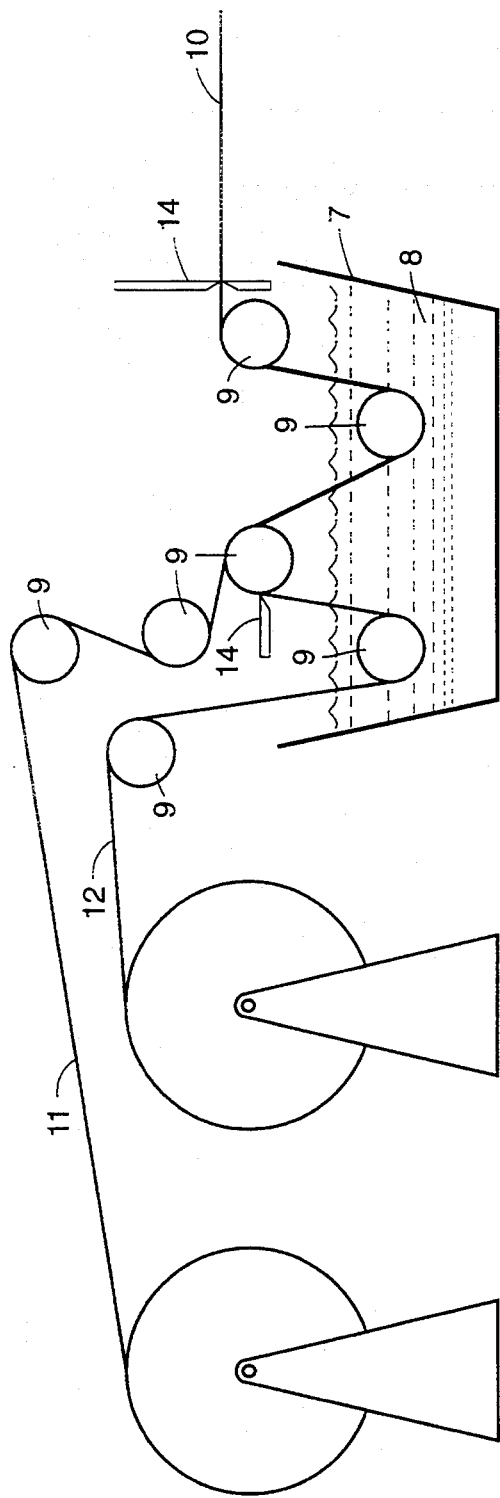
FIG. 6 represents schematically the process of manufacturing a roofing membrane such as the one represented in FIG. 5 by combining reinforcing fabrics, which are unwound from rolls mounted on stands, and passing them through a vat of bituminous material.
Figure 7:
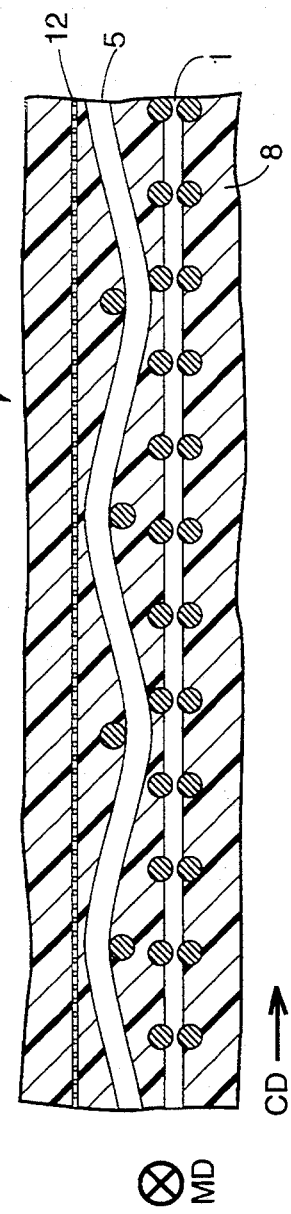
FIG. 7 is an enlarged cross section of a portion of the fabric shown in FIG. 5. This and the other figures are intended to represent clearly features of the present invention, but they are somewhat schematic and are not necessarily drawn to scale.

The process of the present invention may also comprise laminating the above two layers—the high strength, open grid reinforcing fabric 5 and the lightweight over-under non-woven polyester fabric 1—together under heat and pressure to create a single fabric 11 before leading them through the bituminous material with a third fabric, preferably a fiberglass mat 12, as shown in FIG. 6. The process may also comprise laminating all three layers together before leading them through the bituminous material. In addition, the invention may comprise combining the lightweight over-under fabric, the high strength fabric and a fiberglass mat with a fourth or more layers of fabric before leading them through the bituminous material.

As used herein "mat" 12 refers to an entangled mass of filaments 13. These filaments may be either staple filaments of lengths preferably above 25 millimeters (one inch) or continuous filaments. The filaments may be held together by adhesives, binders, finishes, felting, or by the melting under heat and pressure of certain thermoplastic filaments in the mat. A typical polyester mat of the prior art, which the lightweight polyester open grid of the present invention replaces, is known in the trade as "Reemay." As used in roofing membrane construction, lightweight polyester mats are typically much less porous than fiberglass mats, and hence, two layers of bituminous material bind together through fiberglass mats with a much stronger bond than through a lightweight polyester mat. "Mechanically fastened at yarn crossover points" refers to fabrics made by processes such as conventional weaving or weft-inserted warp-knit fabrics, in which knitting yarns are used to hold crossing yarns together.

In the over-under fabric of the present invention we prefer to use polyester yarns 3 having from about 30 to about 300 denier in the fill or cross-machine direction and from about 30 to about 300 denier yarns in the machine direction. When calculating denier of yarns in the machine direction, both the under-yarn and the over-yarn are counted together; hence, a denier of 100 in the machine direction is in fact a 50 denier under-yarn together with a 50 denier over-yarn. It is most preferable to use 60 to 150 denier yarns in the over-under construction fabrics.

We prefer to space these yarns at yarn counts from about 3×3 to about 10×10 yarns per inch, and more preferably from 4×4 to 6×6, with a most preferable count being 6×4. (A pair of over-under machine direction yarns is considered as one yarn in these yarn count figures). The important factor is to have openings significantly larger than openings in the prior art lightweight mats, so that the bitumen on either side of the lightweight fabric passes through the fabric and binds together well with bitumen on the other side of the fabric, creating greater inter-ply adhesion than found in the prior art.

In making the lightweight fabric of 1, this invention, it is preferable to use large amounts of binder 4 to insure that the binding of the over-under yarns is great enough to hold the fill direction yarns during processing. It is preferable to use binder in the amount of about 60 to about 250 parts by weight of binder measured as "dry weight pick-up" (the weight of the binder picked up by the fabric without counting the weight of the liquid used to dissolve or disperse the binder for purposes of application to the fabric) relative to 100 parts by weight of the polyester fabric to which it is applied. The most preferable range is about 100 to about 200 parts of binder, with the most preferable being about 150 parts. Binders for the fabrics of this invention may be thermoplastic, for example a polyvinylchloride, or thermosetting, for example an acrylic.

As an example, using a lightweight open grid of over-under polyester scrim fabric with 150 denier yarns and a 6×4 yarn/inch construction, the spaces between the yarn are large enough for asphalt to form a strong bond through the scrim fabric and improve adhesion in the final roofing membrane product. In spite of this openness, however, this scrim fabric has sufficient surface area to process smoothly during manufacture of the roofing product without coming apart. Moreover, a high strength grid processed between it and a fiberglass mat does not pull out during the dipping and coating process in hot bituminous material or in later cooling stages. Based on experience with prior art open grids held together by adhesive alone (without any mechanical connection at the crossover points), one would have expected this lightweight over-under construction grid to come apart and the high strength grid to come apart and/or pull out of the membrane during such processing.

The above examples are not intended to limit the scope of the invention, which should be given the full breadth encompassed by the description herein and the following claims.

What is claimed is:

1. A reinforced bituminous roofing membrane comprising:
   a first layer consisting essentially of a lightweight, open grid of adhesively bound non-woven fabric in which yarns in the cross-machine direction are held between pairs of yarns in the machine direction, each such pair of yarns having one yarn that is essentially above the other and each such pair of yarns being coated and bound next to the other by adhesive which accumulates between the yarns of each pair;
   a second layer consisting essentially of a high strength reinforcing fabric;

a third layer consisting essentially of a porous fiberglass mat; and a bituminous material that saturates and contains the first, second and third layers, said three layers being completely embedded within the bituminous material and the bituminous material on one side of the membrane bonding through the layers to the bituminous material on the other side of the membrane.

2. A membrane as described in claim 1 which consists essentially of the three layers and the bituminous material as described therein.

3. A membrane as described in claim 1 in which, in the first layer, the yarns consist essentially of polyester;

the yarns in the cross-machine direction have a weight of about 30 to about 300 denier;

each pair of yarns in the machine direction has a weight together of about 30 to about 300 denier;

the yarn count is from about 3 yarns per inch to about 10 yarns per inch in each of the machine and cross-machine directions; and the yarns are adhered together with a binder in the amount of about 60 to about 250 parts by weight of binder for every 100 parts by weight of polyester in the first layer.

4. A membrane as described in claim 3 which consists essentially of the three layers and the bituminous material described therein.

5. A membrane as described in claim 3 in which the yarns in the cross-machine direction have a weight of about 60 to about 150 denier, and each pair of yarns in the machine direction has a weight together of about 60 to about 150 denier.

6. A membrane as described in claim 3 in which the amount of binder used is about 100 to 200 parts by weight of polyester in the first layer.

* * * * *